United States Patent
Yang et al.

(10) Patent No.: US 11,858,570 B2
(45) Date of Patent: Jan. 2, 2024

(54) AUTONOMOUS MOBILE ROBOT

(71) Applicant: ROBOTIS CO., LTD., Seoul (KR)

(72) Inventors: Woo Sik Yang, Seoul (KR); Byoung Soo Kim, Seoul (KR); In Yong Ha, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 0 days.

(21) Appl. No.: 17/738,411

(22) Filed: May 6, 2022

(65) Prior Publication Data

US 2022/0258818 A1 Aug. 18, 2022

Related U.S. Application Data

(63) Continuation of application No. PCT/KR2020/016556, filed on Nov. 23, 2020.

(30) Foreign Application Priority Data

Nov. 25, 2019 (KR) .................. 10-2019-0152539

(51) Int. Cl.
B62D 61/12 (2006.01)

(52) U.S. Cl.
CPC .................. B62D 61/125 (2013.01)

(58) Field of Classification Search
CPC ... B25J 11/008; B25J 5/00; B25J 5/007; B25J 9/08; B25J 11/00; B62D 57/024; B60P 9/00
USPC .................................................. 180/209, 8.2
See application file for complete search history.

(56) References Cited

U.S. PATENT DOCUMENTS

| | | | |
|---|---|---|---|
| 4,993,912 A | 2/1991 | King et al. | |
| 8,370,990 B2 * | 2/2013 | Yu | B62D 57/028 15/340.1 |
| 2018/0194411 A1 * | 7/2018 | Liivik | B60G 17/0165 |
| 2021/0114226 A1 * | 4/2021 | Mei | B25J 5/007 |
| 2021/0145667 A1 * | 5/2021 | Batke | A61G 5/06 |
| 2021/0283965 A1 * | 9/2021 | Isono | B60G 5/01 |

FOREIGN PATENT DOCUMENTS

| | | |
|---|---|---|
| JP | 2004136418 A | 5/2004 |
| JP | 2009234534 A | 10/2009 |
| JP | 2011235692 A | 11/2011 |
| KR | 1020040008373 A | 1/2004 |
| KR | 100690669 B1 | 3/2007 |

(Continued)

OTHER PUBLICATIONS

Osamu Carrying Robot, JP 2004136418 A, Original Document with English translation, Filed Oct. 18, 2002, retrieved Mar. 30, 2023 (Year: 2002).*

(Continued)

*Primary Examiner* — Paul N Dickson
*Assistant Examiner* — Caitlin Anne Miller
(74) *Attorney, Agent, or Firm* — Dinsmore & Shohl LLP

(57) ABSTRACT

An autonomous mobile robot is provided. The autonomous mobile robot includes an upper module including a cargo space provided therein, and a cover, a lower module positioned under the upper module and providing a driving force, and a driving module provided in the lower module, in which the driving module includes a plurality of pairs of wheels capable of asynchronously contacting a road surface or ground so as to overcome a step or a stair.

8 Claims, 7 Drawing Sheets

(56) References Cited

FOREIGN PATENT DOCUMENTS

| | | | | |
|---|---|---|---|---|
| KR | 1020090089713 | A | 8/2009 | |
| KR | 1020130045290 | A | 5/2013 | |
| KR | 1020150064578 | A | 6/2015 | |
| KR | 1020180044475 | A | 5/2018 | |
| KR | 1020180130157 | A | 12/2018 | |
| KR | 1020190078126 | A | 7/2019 | |
| KR | 102468550 | B1 * | 11/2022 | ........... B62D 57/028 |
| WO | WO-2020034974 | A1 * | 2/2020 | ................ B25J 5/00 |
| WO | WO-2021107554 | A2 * | 6/2021 | ............ B25J 11/008 |

OTHER PUBLICATIONS

Kim KR-20040008373-A Original Document with English translation filed Jan. 31, 2004, retrieved on Mar. 30, 2023 (Year: 2004).*
International Search Report of PCT/KR2020/016556 dated Feb. 24, 2021.

* cited by examiner

AUTONOMOUS MOBILE ROBOT

CROSS-REFERENCE TO RELATED APPLICATIONS

This application is a continuation of International Application No. PCT/KR2020/016556 filed on Nov. 23, 2020, which claims priority to Korean Patent Application No. 10-2019-0152539 filed on Nov. 25, 2019, the entire contents of which are herein incorporated by reference.

TECHNICAL FIELD

The present disclosure relates to an autonomous mobile robot, and more particularly, to an autonomous mobile robot which is capable of autonomously generating and moving a path in indoor and outdoor environments without requiring a user to input a specific driving path, is applicable for general purposes such as transportation of various cargoes, advertisements and guidance, security, and the like, and is, in particular, capable of recognizing and avoiding or overcoming various obstacles such as stairs, steps, or the like.

BACKGROUND ART

Conventionally, stationary industrial robots are widely used, but with the recent technological development of sensors, big data, and artificial intelligence, and the rapid development of autonomous driving technology using them, a number of multi-purpose robots that can be used in various indoor and outdoor environments are being developed.

A representative example of the indoor autonomous mobile robot is a robot vacuum cleaner, and various other robots have also been developed, ranging from logistics, airport/hotel service, guidance, security, as well as pet robots. While indoor environment has relatively good conditions for driving, it is necessary to recognize and avoid possible collision with surrounding objects and people while moving.

Outdoor autonomous mobile robots are particularly difficult to operate in that they are placed in various environmental conditions. For example, it is difficult to achieve successful autonomous driving without taking various factors such as road surface conditions, sudden appearance of pedestrians or companion animals, identification of automobile roads and pedestrian roads, weather changes, and the like into consideration.

In particular, a logistics robot used for the purpose of delivery or cargo transportation should be designed to avoid or overcome a step or stair while also taking consideration of load conditions.

The background technology of the present disclosure is disclosed in Korean Patent No. 10-0690669, and Korean Patent Laid-Open Nos. 10-2018-0044475, 10-2019-0078126, and 10-2018-0130157.

SUMMARY

Technical Problem

A technical object of the present disclosure is to solve the problems of the related art described above, and accordingly, the object is to provide an autonomous mobile robot which is capable of autonomously generating and moving a path in indoor and outdoor environments without requiring a user to input a specific driving path, is applicable for general purposes such as transportation of various cargoes, advertisements and guidance, security, and the like, and is, in particular, capable of recognizing and avoiding or overcoming various obstacles such as stairs, steps, or the like.

The technical problem to be achieved in the present disclosure is not limited to the technical problem described above, and other technical problems that are not mentioned herein will be clearly understood by those skilled in the art to which the present disclosure belongs from the following description.

Technical Solution

In order to achieve the technical problem, an embodiment of the present disclosure provides an autonomous mobile robot including an upper module including a cargo space provided therein, and a cover, a lower module positioned under the upper module and providing a driving force, a driving module provided in the lower module, and a control unit that controls an operation of the driving module, in which the driving module includes a plurality of pairs of wheels capable of asynchronously contacting a road surface or ground so as to overcome steps or stairs.

Effects of Invention

According to an embodiment of the present disclosure, an autonomous mobile robot can be provided, which is capable of autonomously generating and moving a path in indoor and outdoor environments without requiring a user to input a specific driving path, is applicable for general purposes such as transportation of various cargoes, advertisements and guidance, security, and the like, and is, in particular, capable of recognizing and avoiding or overcoming various obstacles such as stairs, steps, or the like.

It should be understood that the effects of the present disclosure are not limited to the effects described above, and include all effects that can be inferred from the configurations of the disclosure described in the detailed description or claims of the present disclosure.

DETAILED DESCRIPTION

Figure 1:
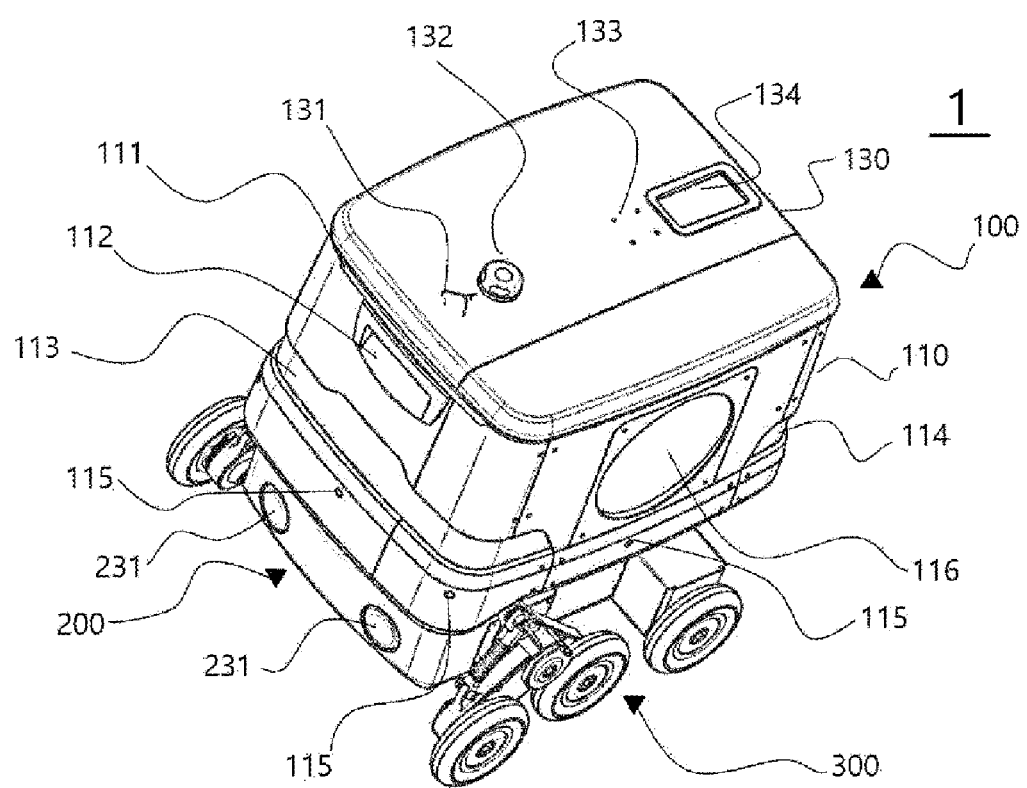
FIG. 1 illustrates an autonomous mobile robot according to an embodiment of the present disclosure.

Hereinafter, the present disclosure will be described with reference to the accompanying drawings. However, the present disclosure can be implemented in a variety of different forms, and therefore, should not be limited to the embodiments described herein. In the following description, parts that are irrelevant to the present disclosure are omitted to clearly describe the disclosure, and the same or similar elements are denoted with the same or similar reference numerals throughout the description.

Throughout the description, when a portion is described as being "connected (joined, contacted, coupled)" to another portion, it includes not only a circumstance when the portions are "directly joined", but also a circumstance when the portions are "indirectly connected" via another member present therebetween. In addition, when a portion is described as "comprising (including)" an element, unless specified to the contrary, it intends to mean that the portion may additionally include another element, rather than excluding the same.

The terms used herein are only for describing certain exemplary embodiments, and not intended to limit the scope of the disclosure. Unless otherwise specified, a singular expression includes a plural expression. The term "comprise" or "have" as used herein is intended to designate an existence of features, numbers, steps, operations, elements, components or a combination of these, and accordingly, this should not be understood as precluding an existence or a possibility of adding one or more of other features, numbers, steps, operations, elements, components or a combination of these.

Embodiments of the present disclosure will be described in detail below with reference to the accompanying drawings.

Figure 2:
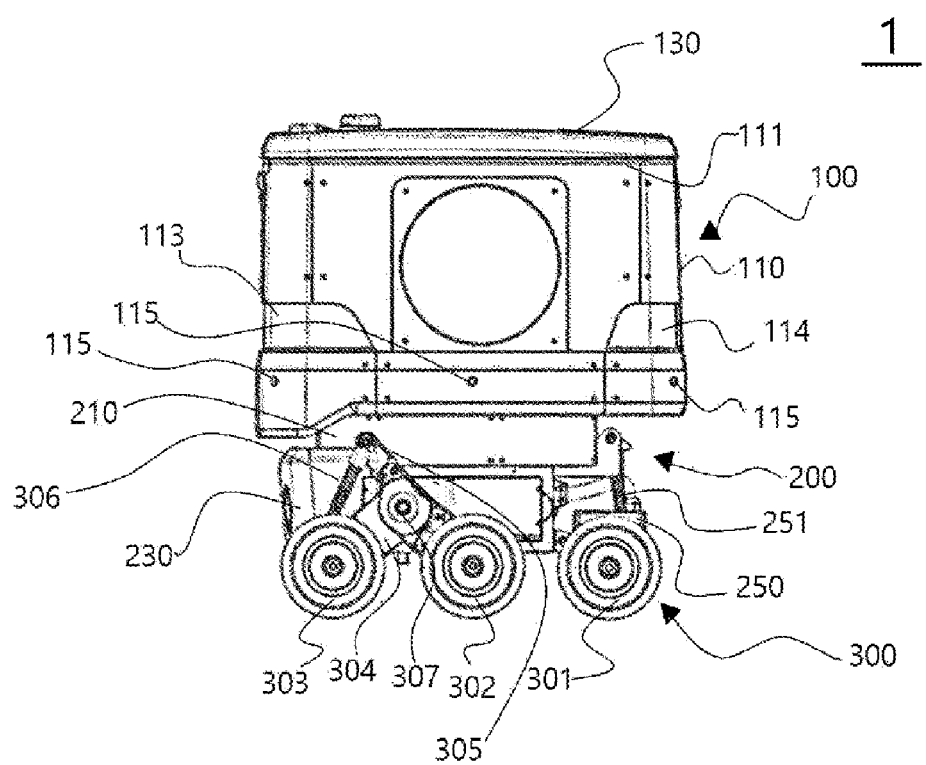
FIG. 2 is a side view of the autonomous mobile robot according to FIG. 1.
Figure 3:
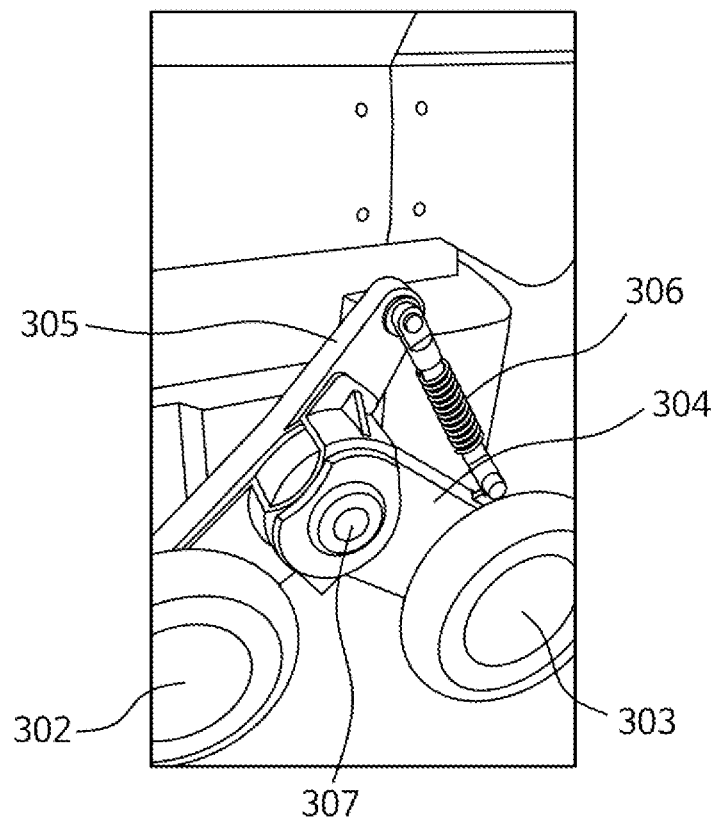
FIGS. 3 and 4 illustrate an operation of a driving module of the autonomous mobile robot according to FIG. 1.
Figure 4:
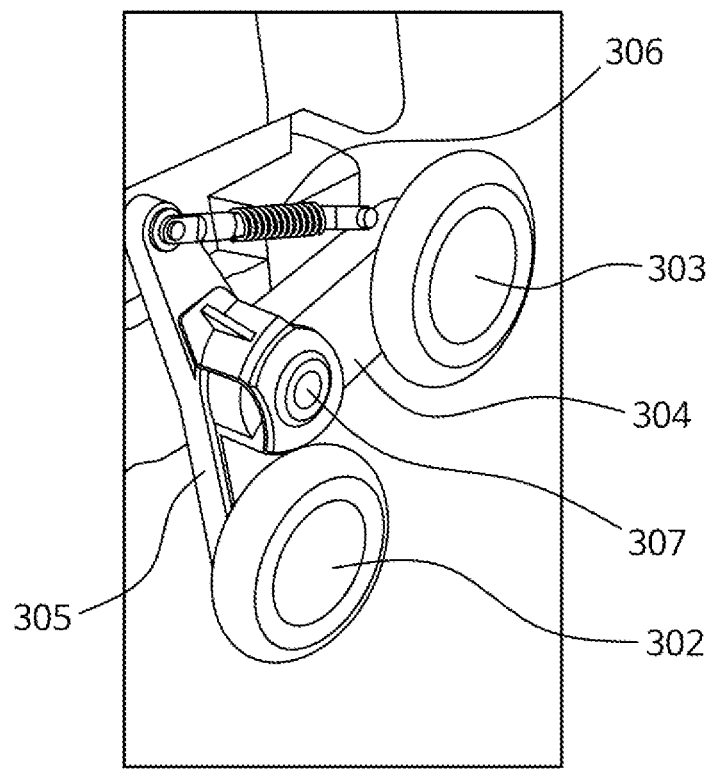
Figure 5:
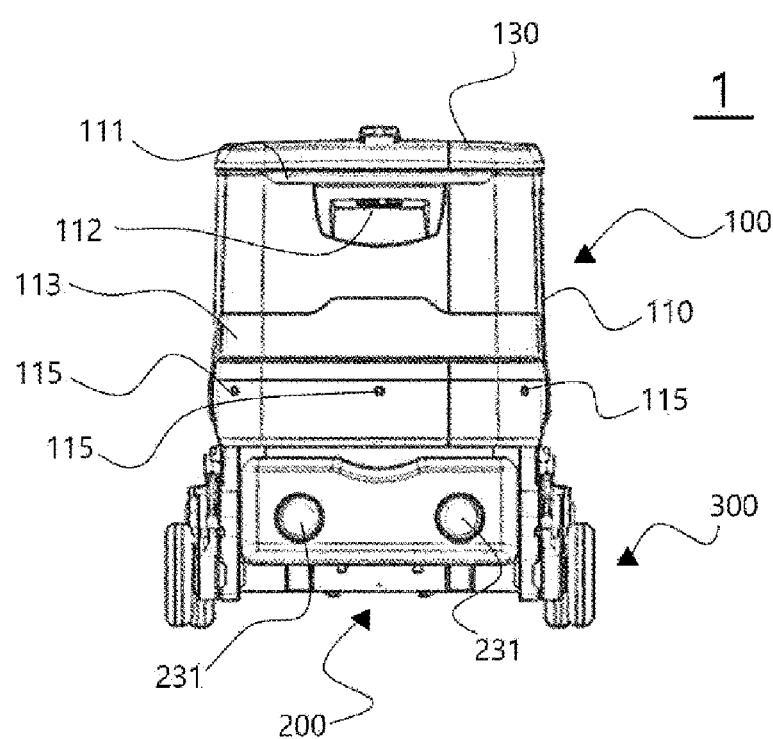
FIG. 5 is a front view of the autonomous mobile robot according to FIG. 1.
Figure 6:
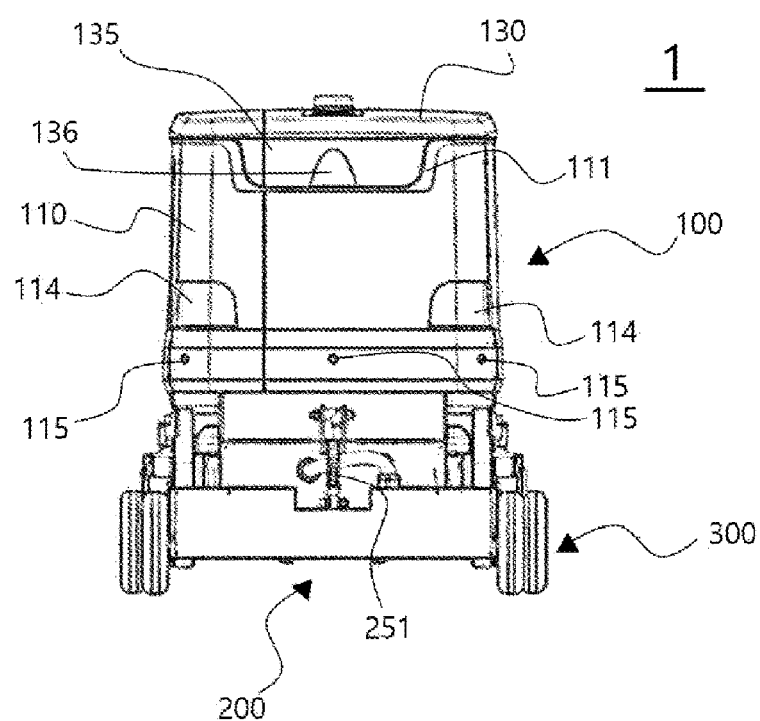
FIG. 6 is a rear view of the autonomous mobile robot according to FIG. 1.
Figure 7:
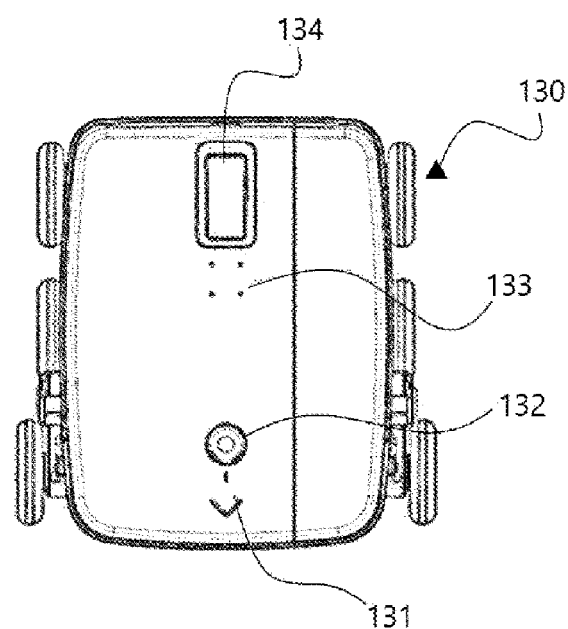
FIG. 7 is a top view of the autonomous mobile robot according to FIG. 1.

FIG. 1 illustrates an autonomous mobile robot according to an embodiment of the present disclosure, FIG. 2 is a side view of the autonomous mobile robot according to FIG. 1, FIGS. 3 and 4 illustrate an operation of a driving module of the autonomous mobile robot according to FIG. 1, FIG. 5 is a front view of the autonomous mobile robot according to FIG. 1, FIG. 6 is a rear view of the autonomous mobile robot according to FIG. 1, and FIG. 7 is a top view of the autonomous mobile robot according to FIG. 1.

As illustrated, an autonomous mobile robot 1 may include an upper module 100, a lower module 200, and a driving module 300.

In the present disclosure, the autonomous mobile robot collectively refers to robots that are capable of autonomously generating a path without requiring a user to input a specific driving path and moving in indoor and outdoor environments, and can be used for purposes such as logistics, advertising, guidance, pets, security, cleaning, transportation, hobbies, and the like, without limitation. In addition, it should be understood that all cases when the user inputs the starting point and the destination, sets driving conditions (e.g., restriction of driving during certain hours), restricts or sets part of the driving path (e.g., restricts driving on automobile roads, intersections, or the like, or allows driving only under the user's supervision), or when the user controls the robot's driving in some driving paths, and the like also fall within the scope of the autonomous mobile robot of the present disclosure.

The upper module 100 may have a cargo space provided therein, and may be provided with a cover 130. The lower module 200 may be positioned under the upper module 100 and provide a driving force to the driving module 300.

The driving module 300 may be provided in the lower module 200. The driving module 300 may include plural pairs of wheels 301; 302; and 303 that may asynchronously contact a road surface or ground to overcome a step or a stair.

This will be explained in more detail as follows. The upper module 100 may include a main body 110 including the cargo space provided therein, and the cover 130 openably connected to an upper side of the main body 110.

An indicator light 111 may be provided on an upper circumference of the main body 110. The indicator light 111 may be provided along the entire circumference of a top side of the main body 110, and may be formed of a plurality of LEDs. The indicator light 111 may indicate a state of the autonomous mobile robot 1 to the outside. To this end, the indicator light 111 may have a plurality of compartments and express a plurality of colors. By using the indicator light 111, it is possible to indicate that the autonomous mobile robot 1 is currently driving, or indicate a driving condition such as an autonomous driving (automatic driving/manual driving), for example. In addition, a driving direction (forward movement, backward movement, left turn, right turn, turn in place, and the like) may be externally indicated, or a driving speed may be indicated (e.g., blue at low speed, red at high speed, and the like), or other various driving conditions or driving states may be externally indicated.

A camera unit 112 for omni-directional monitoring may be provided on a front side of the main body 110. The camera unit 112 may sense an obstacle in front. The camera unit 112 may include a camera or a distance sensor, and may further include lighting. In addition, a separate member may be included to prevent foreign substances, rainwater, or the like from coming into contact with the camera unit 112 or to remove foreign substances, rainwater, or the like adhered onto the camera unit 112. The camera or distance sensor provided in the camera unit 112 may face forward and downward from the main body 110, and may be provided to be drivable to change an installed direction, or to control a direction.

A first protection part 113, which may be transparent or translucent, may be provided on the front side of the main body 110. As illustrated in FIG. 1, the first protection part 113 may be provided along the entire front side of the main body 110 and extended partially to the lateral sides, but is not limited to such shape.

A second protection part 114, which may be transparent or translucent, may be provided on a rear side of the main body 110. As illustrated in FIGS. 1 and 6, the second protection parts 114 may be separately provided at corners where the rear side and the lateral sides of the main body 110 meet each other, respectively.

A camera (not illustrated) may be installed inside the first protection part 113 and the second protection parts 114. A plurality of cameras may be installed, such as, for example, a total of four cameras may be installed at each corner of the main body 110. As long as there is no problem in recognizing the external environment to detect dangerous substances or dangerous conditions, and setting the driving path, the installation positions of the cameras, how may of them are installed, and the like is not particularly limited.

An infrared sensor 115 may be provided in the main body 110. A plurality of infrared sensors 115 may be installed. For example, as illustrated in FIGS. 1, 2, 5, and the like, a total of eight sensors may be installed, including three on the front side of the main body 110, three on the rear side of the main body 110, and one on one lateral side and one on the other lateral side of the main body 110. As long as there is no problem in recognizing surrounding objects, people, pets, and the like and detecting their movements, the installation positions of the infrared sensor 115, how many of them are installed, and the like is not particularly limited.

A display unit 116 may be provided on the lateral side of the main body 110. The installation position of the display unit 116 is not particularly limited, and the driving state, driving conditions, and the like of the autonomous mobile robot 1 may be displayed to the outside through the display unit 116. For example, it may display moving destination or current driving speed of the autonomous mobile robot 1, whether or not cargo is included, and the like. In addition, through the display unit 116, it is possible to advertise or convey information for various purposes.

Although not illustrated, a cargo space may be provided inside the main body 110. In order to provide such a cargo space, a basket for storing cargo may be provided inside the main body 110 while being spatially separated from various members inside the main body 110. In addition, devices for insulation, refrigeration, and freezing purposes may be provided inside for transporting food or the like.

In addition, a pressure sensor such as a load cell or the like may be provided inside the main body 110 to detect the presence or absence of cargo and control driving conditions according to the weight of the cargo. In addition, an internal camera for detecting the presence or absence of cargo, or displaying or transmitting the status and appearance of the cargo to the outside may be provided.

In addition, a sealing member for preventing rainwater ingress may be provided on an inner upper end of the main body 110. In addition, a rain gutter or a rainwater drainage pipe may be provided on the inner upper end of the main body 110 to let out the received rainwater.

The cover 130 may be openably connected to the upper side of the main body 110. For example, the cover 130 may be hinged to a portion of the front side of the main body 110, and an actuator or other driving means may be provided to open and close the cover 130.

The cover 130 may include an antenna 131 for external communication or GPS connection, a LiDAR 132 that can precisely sense the surrounding environment and the movement of the autonomous mobile robot 1, a microphone 133, and a display panel 134. In addition, a speaker or other members may be further provided. For example, by installing a sensing means such as a distance sensor, a camera, or the like, it is also possible to open the cover 130 after recognizing obstacles above the cover 130 and confirming that there is no problem in opening the cover 130.

A separate waterproof structure may be provided to prevent externally exposed parts such as the antenna 131, the LiDAR 132, the microphone 133, the display panel 134, and the like from exposure to the external environment such as rainwater to be specific.

The microphone 133 may be a directional microphone, or may be a microphone that is capable of sensing the position of a sound source using a plurality of microphones.

The display panel 134 is a member capable of exchanging information with a user through the display, and may be a smart phone or a smart pad, for example. For example, for cargo transport, the user (orderer) is able to know that the cargo ordered by the user (orderer) is stored in the autonomous mobile robot 1, and then open the cover 130 by identifying himself/herself by inputting a password on the display panel 134, for example, and take out the ordered cargo.

Referring to FIGS. 1 and 6, the cover 130 may be hinged to the front side of the main body 110, and may include a protrusion 135 provided with a handle 136 on the rear side of the main body 110 for the user to easily open and close the cover 130.

The lower module 200 may be provided under the upper module 100. The lower module 200 may include a connection unit 210, a front driving unit 230, and a rear driving unit 250.

The connection unit 210 may be coupled to a lower end of the upper module 100, and connected to the driving module 300 through the front driving unit 230 and the rear driving unit 250 to serve as support for them.

The front driving unit 230 may include a driving unit that provides driving force to the front wheels, that is, to the second wheel 302 and the third wheel 303 of the driving module 300, and controls positions or rotational force thereof. The driving unit may be a motor, for example.

A lighting 231 may be provided on a front side of the front driving unit 230. The lighting 231 may illuminate the front side of the autonomous mobile robot 1, and may also serve to allow surrounding people to be aware of the existence or movement of the autonomous mobile robot 1.

The rear driving unit 250 may include a driving unit that provides a driving force to the rear wheel, that is, to the first wheel 301 of the driving module 300, and controls position or rotational force thereof. The driving unit may be a motor, for example.

A first suspension unit 251 may be provided between the rear driving unit 250 and the connection unit 210 to provide a suspension to the first wheel 301. The first suspension unit 251 may include a damper and a spring. In addition, although not illustrated, other members for steering or suspension, such as a torsion beam, may be included in the rear driving unit 250.

The driving module 300 may be provided in the lower module 200, and may include a plurality of wheels, that is, the first wheel 301, the second wheel 302, and the third wheel 303, to overcome a step or a stair. In an example, the first wheel 301, the second wheel 302, and the third wheel 303 may be installed in pairs on the left and right sides of the autonomous mobile robot 1, respectively. To this end, the first wheel 301, the second wheel 302, and the third wheel 303 may include two driving wheels provided on the same axis.

The first wheel 301, the second wheel 302, and the third wheel 303 may be connected to separate driving units such as motors respectively so as to be individually driven. Such individual drive control enables various operations such as forward movement, backward movement, left turn, right turn, turn in place, and the like. In addition, it is possible to control the driving module 300 in consideration of various environmental conditions such as road surface conditions, presence or absence of surrounding pedestrians, and the like.

The second wheel 302 and the third wheel 303 may be constrained in position relative to each other so as to be provided as one module.

Referring to FIGS. 2 to 4, the third wheel 303 may be installed at one end of a straight front bar 304. The other end of the front bar 304 may be hinged to an intermediate axis portion 307 of a straight rear bar 305. Accordingly, the front bar 304 is pivotable about the intermediate axis portion 307 of the rear bar 305 within a predetermined angle, but is constrained from movement by a second suspension unit 306 to be described below.

The second wheel 302 may be installed at one end of the rear bar 305. The second wheel 302 and the third wheel 303 positioned on one side (positioned adjacent to each other) may be driven by one driving unit. That is, one motor may be installed in the front driving unit 230, and driving force of the motor may be simultaneously transmitted to the second wheel 302 and the third wheel 303 through a power transmission means such as a belt, chain, or the like. Alternatively, it is also possible to transmit the driving force to only one of the second wheel 302 and the third wheel 303 through the clutch means, or also to properly distribute the driving force to be transmitted to the second wheel 302 and the third wheel 303.

A second suspension unit 306 may be provided between one end of the front bar 304 and the other end of the rear bar 305. The relative positions of the second wheel 302 and the third wheel 303 may be limited within a predetermined range by the second suspension unit 306. The second suspension unit 306 may include a damper and a spring.

Meanwhile, the first suspension unit 251 and the second suspension unit 306 described above may be formed to have variable rigidity or variable damping force.

The second wheel 302 and the third wheel 303, which are formed as one module, may be pivotable (swingable) about the intermediate axis portion 307. A separate driving unit may be required for this purpose.

The first wheel 301, the second wheel 302, and the third wheel 303 provided in the driving module 300 are limited in size. The size of the wheels is limited within a certain size because it greatly affects the size, safety, and stability of the autonomous mobile robot 1, and accordingly, driving of the wheels is limited by plenty of steps, protrusions, stairs, grooves, and the like that may be present on the actual road surface.

The autonomous mobile robot 1 according to an embodiment of the present disclosure has the second wheel 302 and the third wheel 303 integrally pivotable as one module, and thus is able to overcome a step, a stair, and the like.

For example, as illustrated in FIG. 3, both the second wheel 302 and the third wheel 303 may be moved while being in contact with the road surface during normal driving. In this state, when encountered with a step larger than the second wheel 302 and the third wheel 303, the second wheel 302 and the third wheel 303 module may be pivoted as illustrated in FIG. 4 to change the positions of the wheels such that only the second wheel 302 is in contact with the road surface, while the third wheel 303 is in contact with an upper portion of the step. That is, it can be said that the second wheel 302 and the third wheel 303 asynchronously contact the road surface or the ground.

Then, the autonomous mobile robot 1 can ride over the step by the driving force of the third wheel 303 that is in contact with the step. Repeating this process enables a stable driving even at the consecutive steps such as a stair.

Meanwhile, by the pivoting of the second wheel 302 and the third wheel 303 forming one module, it is possible to bring only one or both of the second wheel 302 and the third wheel 303 into contact with the road surface or ground. Accordingly, whether or not the second suspension unit 306 is operated, or operating conditions thereof can be controlled, and an appropriate suspension may be provided to the autonomous mobile robot 1 according to the presence or absence of cargo. Accordingly, driving stability according to driving conditions can be enhanced.

The foregoing description of the present disclosure is for illustrative purposes only, and those of ordinary skill in the art to which the present disclosure pertains will be able to understand that modifications to other specific forms can be easily performed without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

While the scope of the present disclosure is represented by the claims accompanying below, the meaning and the scope of the claims, and all the modifications or modified forms that can be derived from the equivalent concepts will have to be interpreted as falling into the scope of the present disclosure.

MODE FOR EMBODYING INVENTION

The mode for embodying the invention has been described above in the best mode for embodying the invention.

INDUSTRIAL APPLICABILITY

Accordingly, by using the autonomous mobile robot 1 according to the embodiment of the present disclosure, it is possible to autonomously generate and move a path in indoor and outdoor environments without requiring a user to input a specific driving path. The autonomous mobile robot 1 can be used for general purposes such as transportation of various cargoes, advertisements and guidance, security, and the like. In particular, it is able to recognize and avoid or overcome various obstacles such as stair, stair, or the like.

What is claimed is:

1. An autonomous mobile robot, comprising:
   an upper module comprising a cargo space provided therein, and a cover;
   a lower module positioned under the upper module and providing a driving force;
   a driving module provided in the lower module;
   a first wheel;
   a second wheel;
   a third wheel;
   a front bar; and
   a rear bar,
   wherein the first wheel, the second wheel, and the third wheel are connected to separate driving units,
   wherein the third wheel is installed at one end of the front bar,
   wherein the other end of the front bar is hinged to an intermediate axis portion of the rear bar, and
   wherein the driving module comprises a plurality of pairs of wheels including the first wheel, the second wheel, and the third wheel and capable of asynchronously contacting a road surface or ground so as to overcome a step or a stair.

2. The autonomous mobile robot of claim 1,
   wherein the second wheel and the third wheel are constrained in position relative each other so as to be provided as one module.

3. The autonomous mobile robot of claim 1,
   wherein the front bar is pivotable about the intermediate axis portion of the rear bar within a predetermined angle.

4. The autonomous mobile robot of claim 1,
   wherein the second wheel is installed at one end of the rear bar.

5. The autonomous mobile robot of claim 1,
   wherein the lower module comprises:
   a front driving unit;
   a rear driving unit; and
   a connection unit coupled to a lower end of the upper module and connected to the driving module through the front unit and the rear driving unit.

6. The autonomous mobile robot of claim 5,
   wherein the front driving unit provides driving force to the second wheel and the third wheel.

7. The autonomous mobile robot of claim 5, further comprising:
   a first suspension unit provided between the rear driving unit and the connection unit to provide a suspension to the first wheel.

8. The autonomous mobile robot of claim 1, further comprising:
   a second suspension unit provided between one end of the front bar and the other end of the rear bar.

* * * * *